United States Patent
Thomae et al.

(10) Patent No.: US 10,245,913 B2
(45) Date of Patent: Apr. 2, 2019

(54) VIBRATION DAMPER AND MOTOR VEHICLE

(71) Applicant: ZF FRIEDRICHSHAFEN AG, Friedrichshafen (DE)

(72) Inventors: Achim Thomae, Bergrheinfeld (DE); Helmut Baalmann, Bergrheinfeld (DE); Wilhelm-Heinrich Broocks, Kürnach (DE); Oswald Lichtlein, Bergtheim (DE); Steffen Heyn, Niederwerrn (DE); Andreas Förster, Schweinfurt (DE); Joachim Gajek, Möhrendorf (DE); Robert Pradel, Röthlein (DE); Anke Sonnemann, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/519,056

(22) PCT Filed: Sep. 15, 2015

(86) PCT No.: PCT/EP2015/070994
§ 371 (c)(1),
(2) Date: Apr. 13, 2017

(87) PCT Pub. No.: WO2016/058761
PCT Pub. Date: Apr. 21, 2016

(65) Prior Publication Data
US 2017/0240016 A1  Aug. 24, 2017

(30) Foreign Application Priority Data

Oct. 14, 2014  (DE) .................. 10 2014 220 719

(51) Int. Cl.
*F16F 9/10* (2006.01)
*B60G 13/14* (2006.01)

(52) U.S. Cl.
CPC .............. *B60G 13/14* (2013.01); *F16F 9/10* (2013.01); *B60G 2202/24* (2013.01);
(Continued)

(58) Field of Classification Search
CPC .............. B60G 13/14; B60G 2202/24; B60G 2206/41; B60G 2500/10
See application file for complete search history.

(56) References Cited

U.S. PATENT DOCUMENTS 4,650,042 A * 3/1987 Knecht et al. ............ F16F 9/46
180/266.6
5,070,284 A  12/1991 Patil et al.
(Continued)

FOREIGN PATENT DOCUMENTS

DE  692 04 477  2/1993
DE  692 18 373  7/1997
(Continued)

*Primary Examiner* — Faye M Fleming
(74) *Attorney, Agent, or Firm* — Cozen O'Connor

(57) ABSTRACT

A vibration damper with a piston, a piston rod fastened to the piston, a working chamber divided by the piston into a first working chamber and second working chamber, and a generator drivable by movement of the piston rod. The damping force of the vibration damper can be influenced by energization of the generator. An energizable component part is provided that short-circuits the windings of the generator when unenergized and cancels the short circuit when energized.

14 Claims, 3 Drawing Sheets

(52) U.S. Cl.
CPC .... *B60G 2202/416* (2013.01); *B60G 2204/62* (2013.01); *B60G 2206/41* (2013.01); *B60G 2300/60* (2013.01); *B60G 2500/10* (2013.01); *F16F 2230/24* (2013.01)

(56) References Cited

U.S. PATENT DOCUMENTS

| | | |
|---|---|---|
| 8,392,030 B2 | 3/2013 | Anderson et al. |
| 8,783,695 B2 * | 7/2014 | Murakami et al. ........ B62J 6/02 280/5.514 |

FOREIGN PATENT DOCUMENTS

| | | |
|---|---|---|
| DE | 103 20 053 | 11/2004 |
| EP | 0 436 870 | 7/1991 |

\* cited by examiner

VIBRATION DAMPER AND MOTOR VEHICLE

CROSS REFERENCE TO RELATED APPLICATIONS

This is a U.S. national stage of application No. PCT/EP2015/070994, filed on Sep. 15, 2015. Priority is claimed on German Application No.: DE102014220719.3, filed Oct. 14, 2014, the content of which is incorporated here by reference.

BACKGROUND OF THE INVENTION

1. Field of the Invention

The invention is directed to a vibration damper with a piston, a piston rod fastened to the piston, and a working chamber divided by the piston into a first working chamber and second working chamber, and a generator drivable by movement of the piston rod, the damping force of the vibration damper can be influenced by the energizing of the generator.

2. Description of Prior Art

A vibration damper of this type comes from U.S. Pat. No. 8,392,030 B2, for example. In the vibration damper according to U.S. Pat. No. 8,392,030 B2, the generator is connected to a pump that drives it. The resistance for the flowing fluid and, accordingly, the damping force of the vibration damper can also be adjusted via the energizing of the generator and of the pump connected to it.

This system works without disruptions according to expectations. During a disruption of the circuit or at least of the energization of the generator, the generator ceases to provide power so that the resistance in the vibration damper is very low, even tending toward zero. The vibration damper accordingly forfeits damping force.

SUMMARY OF THE INVENTION

In view of the foregoing, an object of the present application is to provide a vibration damper that still has damping force even in case of an energization outage of the generator.

In order to solve this problem, it is provided in a vibration damper of the type mentioned in the introductory part that an energizable component part is provided that short-circuits the windings of the generator when unenergized and cancels the short circuit when energized. The core of the invention is considered to be that in a vibration damper whose damping force is generated by a generator the unenergized state is regarded as basic state, and the generator is configured in such a way that, in this case, a maximum damping force is present. On the other hand, it is considered to be an exceptional case when the generator is energized and brought via an energizable component part into a state which makes possible a damping force other than the maximum damping force.

Thus in contrast to the prior art, the damping force of the vibration damper is at a maximum unless the generator or energizable component part is energized.

The energizable component part can preferably be formed as a relay. Relays are known in principle as basic electrical components.

The energizable component part can preferably be arranged at the generator. Since the energizable component part is intended to short-circuit the windings of the generator, it is advantageous when the energizable component part is arranged in spatial proximity to the generator.

In an advantageous manner, an energy supply device can be provided for supplying the energizable component part. The energy supply device is preferably formed as a capacitor. The short-circuiting of the windings of the generator should not be carried out immediately in every type of power outage because temporary power outages, particularly in the range of several microseconds to several milliseconds and several dozen milliseconds, are more frequent, even when there is no fundamental interruption of the power supply. This is the case especially on uneven roadways. In this situation, the energizing of the energizable component part must be ensured. The time span to be covered is preferably less than one second. This can be ensured through a corresponding configuration of the capacitor.

The generator can preferably be connected to a hydraulic motor. This hydraulic motor is preferably constructed as a pump. The pump impeller is then driven via the movement of the piston rod, the hydraulic motor produces the connection between the fluid of the vibration damper and the generator.

The hydraulic motor can preferably have a reversal of rotational direction. The overall construction can be simplified in this way because no valves are needed for controlling the flow direction of the fluid.

In an advantageous manner, the energizing of the energizable component part can be stopped depending on operating parameters or driving parameters.

The invention is also directed to a motor vehicle. This is characterized in that it has a vibration damper of the type described.

BRIEF DESCRIPTION OF THE DRAWINGS

Further advantages, details and features follow from the below-indicated figures and embodiment examples. In the drawings.

DETAILED DESCRIPTION OF THE PRESENTLY PREFERRED EMBODIMENTS

Figure 1:
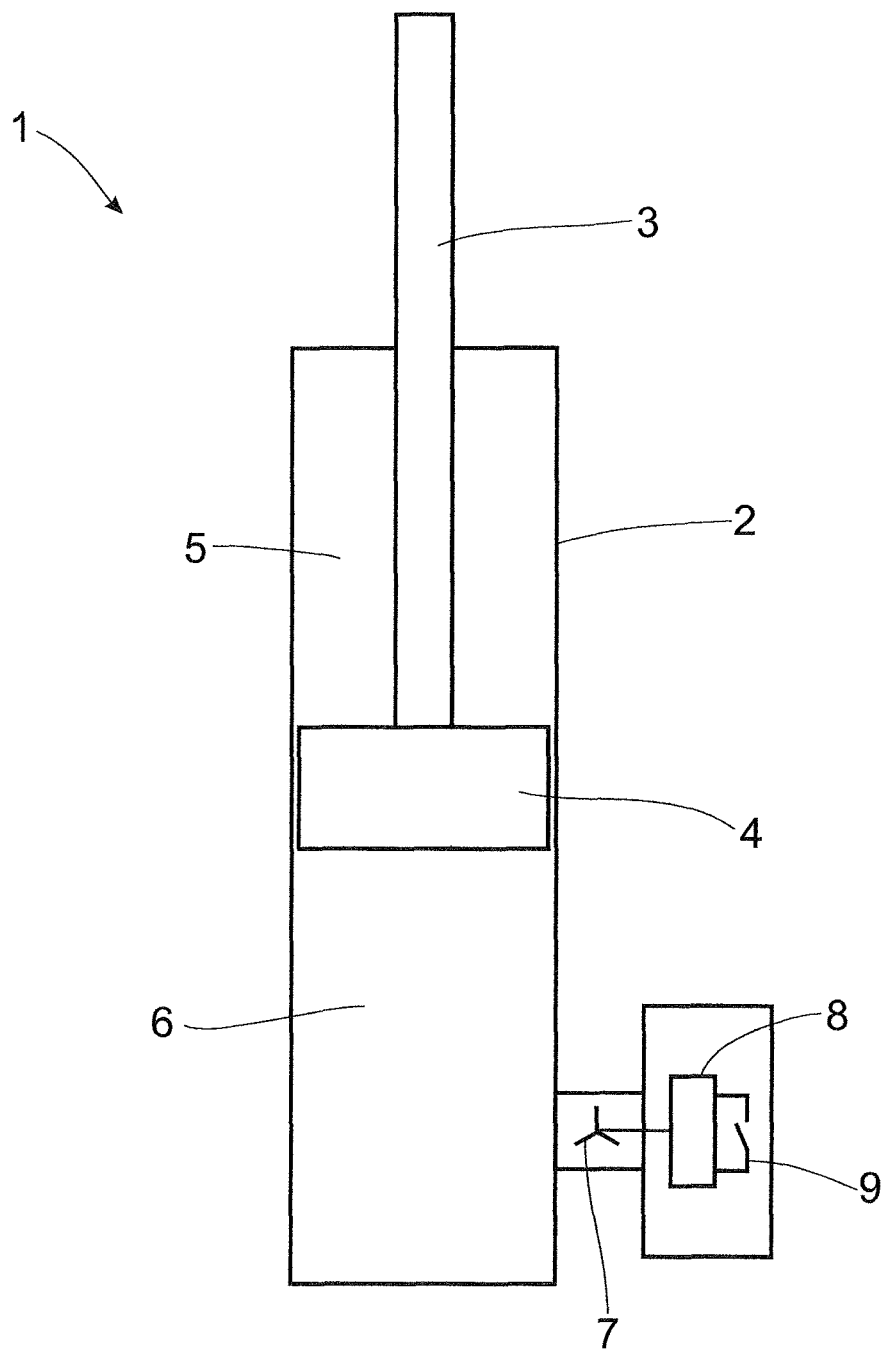
FIG. 1 is a vibration damper with a generator.

FIG. 1 shows a vibration damper 1 with at least one cylinder 2, a piston rod 3 and a piston 4. The piston 4 divides the working chamber of the cylinder 2 into a first working chamber 5 and a second working chamber 6. The vibration damper 1 can also be constructed differently; in particular, it can be constructed as a two-tube damper with an intermediate tube so that the first working chamber 5 and the second working chamber 6 can be connected via the hydraulic motor 7. A movement of the piston 4 in the cylinder 2 causes a flow of fluid from the first working chamber 5 via the hydraulic motor 7 to the second working chamber 6, or vice versa, depending on whether the movement is a rebound movement or compression movement. A generator 8 is connected to the hydraulic motor 7, and the damping force of the vibration damper 1 is also adjustable via the generator 8. Further, an energizable component part 9 is located at generator 8. When the energizable component part 9 is energized, it cancels a short circuit present at the generator or at the windings of the generator, whereas when unenergized it short-circuits the windings of the generator 8.

The movement of the hydraulic motor 7 is heavily damped as a result of the short circuit so that the flow resistance and, therefore, the damping force of the vibration damper 1 is increased.

During operation and in the absence of disruption, the energizable component part 9 is energized, which is why, without disruption, the damping force of the vibration damper 1 can be controlled by energization of the generator 8. In this regard, the generator 8 and the energizable component part 9 are supplied through the same power source so that the energizable component part 9 only short-circuits generator 8 when it is unenergized itself.

Figure 2:
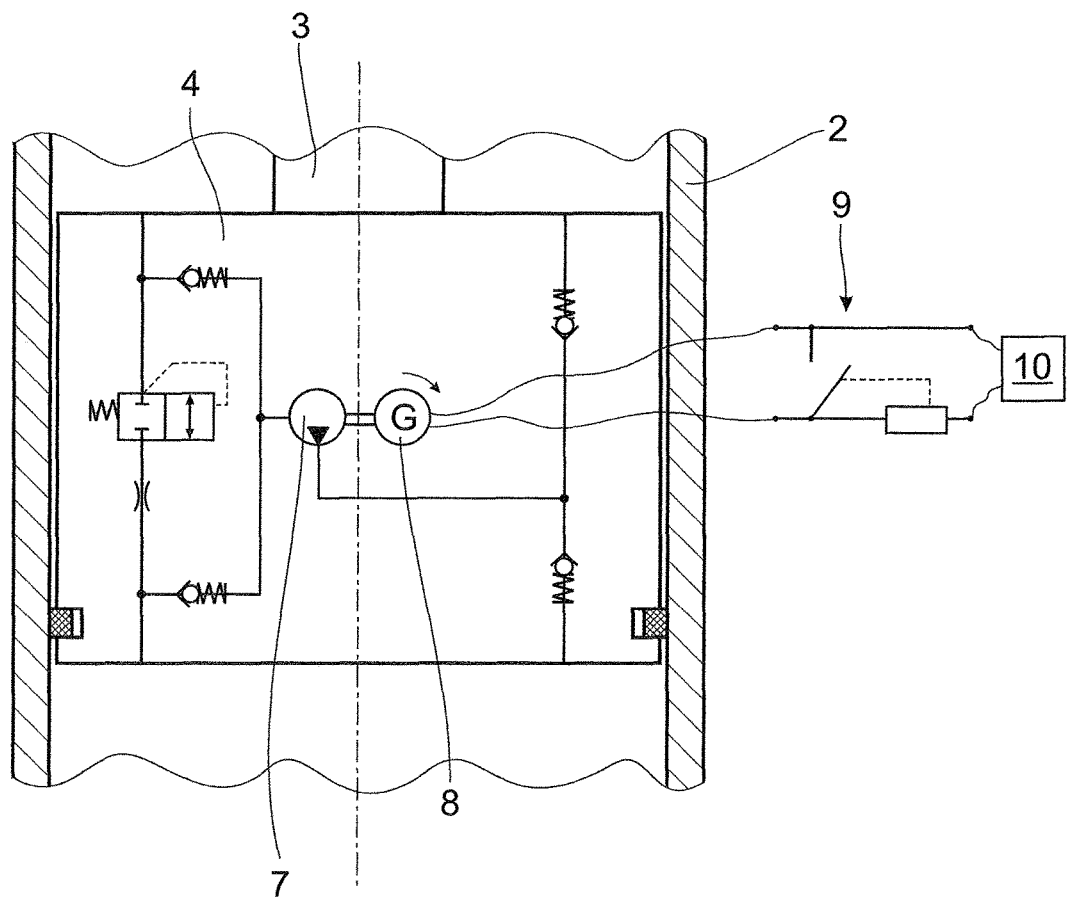
FIG. 2 is an alternative arrangement of the generator.

FIG. 2 shows an alternative configuration in which the generator 8 and the hydraulic motor 7 are arranged in piston 4. In this case, the energizable component part 9 constructed as a relay is located outside of the cylinder 2, but there is an electrical connection to generator 8. The generator 8 is connected to a control device 10 via the energizable component part 9.

Figure 3:
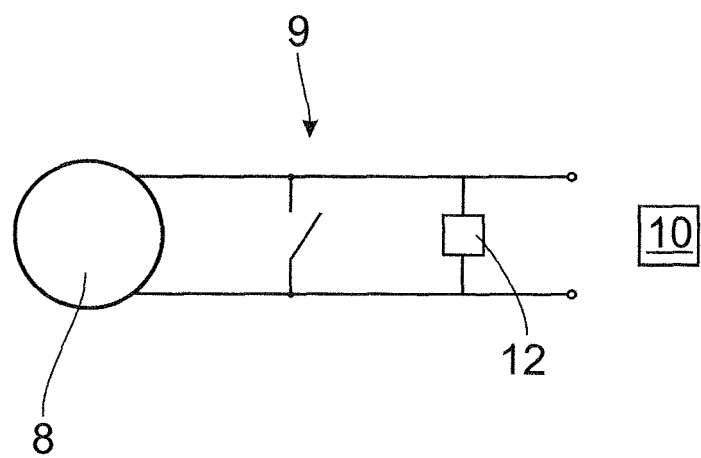
FIG. 3 is a wiring diagram with capacitor.

FIG. 3 shows a possible further development of the vibration damper 1 in which a capacitor 12 is arranged as energy supply device in the circuit so that the energizable component part 9 is also supplied with power temporarily, particularly for less than one second, when the power supply is interrupted, for example, due to unevenness in the roadway. The capacitor 12 helps to differentiate, so to speak, between roadway unevenness and emergencies.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper comprising:
a piston;
a piston rod fastened to the piston;
a working chamber divided by the piston into a first working chamber and second working chamber;
a generator drivable by a movement of the piston rod, wherein a damping force of the vibration damper is influenced by energization of the generator; and
an energizable component part that is configured to short-circuit windings of the generator when unenergized and cancels the short circuit when energized.

2. The vibration damper according to claim 1, wherein the energizable component part is a relay.

3. The vibration damper according to claim 1, wherein the energizable component part is arranged at the generator.

4. The vibration damper according to claim 1, wherein an energy supply device is provided that supplies the energizable component part.

5. The vibration damper according to claim 4, wherein the energy supply device is a capacitor.

6. The vibration damper according to claim 1, wherein the generator is coupled to a hydraulic motor.

7. The vibration damper according to claim 6, wherein the hydraulic motor is constructed as a pump.

8. The vibration damper according to claim 6, wherein the hydraulic motor has a reversal of rotational direction.

9. A vibration damper comprising:
a piston;
a piston rod fastened to the piston;
a working chamber divided by the piston into a first working chamber and second working chamber;
a generator drivable by a movement of the piston rod, wherein a damping force of the vibration damper is influenced by energization of the generator; and
an energizable component part that is configured to short-circuit windings of the generator when unenergized and cancels the short circuit when energized,
wherein the energizing of the energizable component part can be stopped depending on at least one of an operating parameter and a driving parameter.

10. A motor vehicle comprising:
at least one vibration damper comprising:
a piston;
a piston rod fastened to the piston;
a working chamber divided by the piston into a first working chamber and second working chamber;
a generator drivable by a movement of the piston rod, wherein a damping force of the at least one vibration damper is influenced by energization of the generator; and
an energizable component part that is configured to short-circuit windings of the generator when unenergized and cancels the short circuit when energized.

11. The vibration damper according to claim 2, wherein the energizable component part is arranged at the generator.

12. The vibration damper according to claim 3, wherein an energy supply device is provided that supplies the energizable component part.

13. The vibration damper according to claim 7, wherein the hydraulic motor has a reversal of rotational direction.

14. The motor vehicle according to claim 10, wherein the energizing of the energizable component part can be stopped depending on at least one of an operating parameter and a driving parameter.

* * * * *